UNITED STATES PATENT OFFICE.

ADRIAN KLOCZEWSKI AND DEMETRY MINDELEFF, OF WASHINGTON, D. C.

IMPROVEMENT IN MUCILAGE.

Specification forming part of Letters Patent No. 137,213, dated March 25, 1873.

*To all whom it may concern:*

Be it known that we, ADRIAN KLOCZEWSKI and DEMETRY MINDELEFF, both of the city and county of Washington, District of Columbia, have invented a new and useful Improved Mucilage; and we do hereby declare the following to be a full, clear, and exact description of the same.

The object of this invention is to produce a cheap and useful compound for causing paper, leather, wood, &c., to adhere to the surfaces of each other or similar substances; and it consists in the combination of ingredients which we will now proceed to describe.

Take gluten prepared from wheat or other flour, still in a wet state, and add to it a sufficiency of acetic acid to produce a mixture of the consistency of molasses, by shaking or other mechanical operation. With each gallon of this solution mix well two ounces of tannic acid or four ounces of extract of gall-nuts. This makes an insoluble mucilage. To improve its tenacity and density, to each gallon add one ounce of chloride of calcium dissolved in an equal amount of water, also a trifle more sulphuric acid (diluted in three times its bulk of water) than may be necessary to decompose the chloride of calcium.

The addition of a little carbolic acid has the effect of preserving the gluten and improving the odor of the mucilage.

Having thus described our invention, what we claim is—

1. The improved mucilage, consisting of gluten with acetic and tannic acids, substantially as described.

2. The combination of gluten with acetic, tannic, and sulphuric acids and chloride of calcium, in the manner described.

3. The combination of gluten with acetic, tannic, sulphuric, and carbolic acids and chloride of calcium, in the manner described.

ADRIAN KLOCZEWSKI.

Witnesses:
N. K. ELLSWORTH,
M. CHURCH.

DEMETRY MINDELEFF.

Witnesses:
N. K. ELLSWORTH,
M. CHURCH.